United States Patent

Schäfer

(10) Patent No.: US 10,400,751 B2
(45) Date of Patent: Sep. 3, 2019

(54) METHOD FOR OPERATING A WIND TURBINE, WIND TURBINE AND COMPUTER PROGRAM PRODUCT

(71) Applicant: SENVION GmbH, Hamburg (DE)

(72) Inventor: Tobias Schäfer, Oeversee (DE)

(73) Assignee: SENVION GmbH, Hamburg (DE)

( * ) Notice: Subject to any disclaimer, the term of this patent is extended or adjusted under 35 U.S.C. 154(b) by 0 days.

(21) Appl. No.: 15/753,087

(22) PCT Filed: Aug. 16, 2016

(86) PCT No.: PCT/EP2016/069439
§ 371 (c)(1),
(2) Date: Feb. 15, 2018

(87) PCT Pub. No.: WO2017/029294
PCT Pub. Date: Feb. 23, 2017

(65) Prior Publication Data
US 2018/0238302 A1  Aug. 23, 2018

(30) Foreign Application Priority Data
Aug. 17, 2015  (DE) .................. 10 2015 010 491

(51) Int. Cl.
*F03D 7/02* (2006.01)
*F03D 7/04* (2006.01)

(52) U.S. Cl.
CPC ........... *F03D 7/026* (2013.01); *F03D 7/0276* (2013.01); *F03D 7/0284* (2013.01); *F03D 7/043* (2013.01);
(Continued)

(58) Field of Classification Search
USPC .................................. 290/44, 55; 702/113
See application file for complete search history.

(56) References Cited

U.S. PATENT DOCUMENTS 7,456,510 B2 * 11/2008 Ito ..................... H02P 9/08
   290/44
7,860,663 B2 * 12/2010 Miyasaka ............. G01H 1/003
   702/113
(Continued)

FOREIGN PATENT DOCUMENTS

DE  102009005272  7/2009
EP    0008584    12/1981
(Continued)

OTHER PUBLICATIONS

International Search Report and Written Opinion dated Nov. 4, 2016, directed to International Application No. PCT/EP2016/069439; 6 pages.

*Primary Examiner* — Pedro J Cuevas
(74) *Attorney, Agent, or Firm* — Morrison & Foerster LLP

(57) ABSTRACT

A method for operating a wind turbine, the method including, in response to receiving a request for a system start of the wind turbine, monitoring at least one measured value over a predetermined monitoring period; and effecting the system start in response to determining that the at least one measured value in the monitoring period corresponds to defined specifications, wherein: the at least one measured value is stored continuously in a data storage and a storage period in the data storage corresponds to at least the predetermined monitoring period, and monitoring the at least one measured value in response to receiving the request for the system start comprises checking, on the basis of the data storage, whether the at least one measured value in a storage period corresponding to the monitoring period before the request corresponds to the defined specifications.

17 Claims, 2 Drawing Sheets

(52) U.S. Cl.
CPC .......... *F03D 7/047* (2013.01); *F05B 2270/32* (2013.01); *Y02E 10/723* (2013.01)

(56) References Cited

U.S. PATENT DOCUMENTS

| | | | | |
|---|---|---|---|---|
| 8,013,459 | B2* | 9/2011 | Ito | H02P 9/08 290/44 |
| 8,082,115 | B2* | 12/2011 | Bechhoefer | F03D 7/047 702/34 |
| 8,249,852 | B2* | 8/2012 | Thulke | F03D 7/045 703/18 |
| 8,442,778 | B2* | 5/2013 | Bechhoefer | F03D 7/047 702/34 |
| 8,742,610 | B2* | 6/2014 | Brown | F03D 7/0244 290/44 |
| 9,423,290 | B2* | 8/2016 | Sakaguchi | G01H 1/003 |
| 9,458,835 | B2* | 10/2016 | Ikeda | F03D 17/00 |
| 9,816,483 | B2* | 11/2017 | Nakamura | F03D 7/00 |
| 9,915,585 | B2* | 3/2018 | Pettersson | G01M 13/021 |
| 10,047,726 | B2* | 8/2018 | Sakaguchi | F03D 9/25 |
| 2002/0013635 | A1* | 1/2002 | Gotou | G01M 13/045 700/108 |
| 2004/0151578 | A1* | 8/2004 | Wobben | F03D 17/00 415/4.1 |
| 2006/0249957 | A1* | 11/2006 | Ito | H02P 9/08 290/44 |
| 2007/0194574 | A1 | 8/2007 | Kabatzke et al. | |
| 2008/0234964 | A1* | 9/2008 | Miyasaka | G01H 1/003 702/113 |
| 2009/0079195 | A1* | 3/2009 | Ito | H02P 9/08 290/44 |
| 2010/0138182 | A1* | 6/2010 | Jammu | F03D 7/026 702/113 |
| 2011/0125419 | A1* | 5/2011 | Bechhoefer | F03D 7/047 702/34 |
| 2011/0293417 | A1* | 12/2011 | Watanabe | F03D 7/0244 416/1 |
| 2011/0304140 | A1* | 12/2011 | Minami | F03D 7/0224 290/44 |
| 2012/0130678 | A1* | 5/2012 | Ishioka | G05B 23/024 702/179 |
| 2013/0214534 | A1* | 8/2013 | Nakamura | F03D 7/00 290/44 |
| 2013/0221676 | A1* | 8/2013 | Caldwell | F04B 17/02 290/55 |
| 2013/0292943 | A1* | 11/2013 | Brown | F03D 7/0244 290/44 |
| 2014/0007657 | A1* | 1/2014 | Matsubara | G01M 13/04 73/53.05 |
| 2014/0054894 | A1* | 2/2014 | Olesen | G01H 9/00 290/44 |
| 2015/0116131 | A1* | 4/2015 | Ikeda | F03D 17/00 340/870.07 |
| 2017/0130700 | A1* | 5/2017 | Sakaguchi | F03D 7/04 |
| 2017/0234304 | A1* | 8/2017 | Sakaguchi | F03D 9/25 73/112.01 |

FOREIGN PATENT DOCUMENTS

| | | |
|---|---|---|
| EP | 2290233 | 3/2011 |
| EP | 2840257 | 2/2015 |

* cited by examiner

METHOD FOR OPERATING A WIND TURBINE, WIND TURBINE AND COMPUTER PROGRAM PRODUCT

CROSS-REFERENCE TO RELATED APPLICATIONS

This application is a national stage application under 35 USC 371 of International Application No. PCT/EP2016/069439, filed Aug. 16, 2016, which claims the priority of DE Application No. 10 2015 010 491.8, filed Aug. 17, 2015, the entire contents of each of which are incorporated herein by reference.

FIELD OF THE INVENTION

The invention relates to a method for operating a wind turbine, to a wind turbine designed to implement the method, and to a computer program product.

BACKGROUND OF THE INVENTION

Wind turbines are known from the prior art. They usually comprise a rotor that is rotatably arranged on a nacelle, wherein the nacelle in turn is rotatably arranged on a tower. The rotor drives a generator, possibly via a rotor shaft and a transmission. A wind-induced rotational motion of the rotor can thus be converted into electrical energy, which can then, via inverters and/or transformers—also at least partly directly, depending on the design of the generator—be fed into an electricity grid.

If the energy generation or the infeed of energy is discontinued in a wind turbine, for example because there is a fault in the grid or the wind turbine, or the grid operator makes a corresponding request, the wind turbine is put into idling mode or coasting mode.

If the wind turbine is to be put back into service after the fault that has occurred has been rectified or at the request of the grid operator, the wind conditions at the wind turbine are regularly observed in the prior art over a certain period of time after elimination of the fault or after receipt of the request. A corresponding check over a period of, for example, two minutes is required in order to preclude, solely on the basis of a gust, the assumption of a wind speed sufficient for starting the wind turbine. The latter could be the case, for example, if solely the momentarily measured wind speed were checked for starting the wind turbine. Since each operation of starting a wind turbine can represent a significant load for individual components of the wind turbine, it is ensured, by observation of the wind conditions over a certain time period before the actual starting up of the rotor of the wind turbine, that the wind turbine will not unsuccessfully attempt to start due to a gust.

A disadvantage of this prior art is that after elimination of a fault of the wind turbine or the grid, or after receipt of a request from the network operator, a certain period of time, for example of two minutes or more, passes before the wind turbine is actually started up to feed to electrical energy into the grid.

SUMMARY OF THE INVENTION

According to some aspects, the invention provides a method for operating a wind turbine, and creating a wind turbine and a computer program product, in which the disadvantages of the prior art no longer occur, or occur only to a lesser extent.

Accordingly, the invention relates to a method for operating a wind turbine, wherein for system start of the wind turbine on request at least one measured value is observed over a predetermined monitoring period and the system start is effected only when the at least one measured value in the monitoring period corresponds to defined specifications, wherein the at least one measured value is stored continuously in a data storage, wherein the storage period in the data storage corresponds at least to the predetermined monitoring period; and upon a request for a system start, it is checked, on the basis of the data storage, whether the at least one measured value in the period corresponding to the monitoring period before the request corresponds to the defined specifications.

The invention furthermore relates to a wind turbine, comprising a rotor having a plurality of rotor blades, which is rotatably arranged on a nacelle that is arranged on a tower, and having a generator, arranged in the nacelle, for converting wind energy acting on the rotor into electrical energy, and a closed-loop control system for controlling the wind turbine and its components, wherein the wind turbine furthermore comprises at least one sensor for sensing at least one measured value, a data storage for continuously storing the at least one sensed measured value for a storage period, and a verification module for verifying, in the case of a request for a system start, on the basis of the data storage, whether the at least one measured value in the period corresponding to a predetermined monitoring period corresponds to predefined specifications before the request, wherein the storage period at least corresponds to the predetermined monitoring period, and the closed-loop control system is designed such that the wind turbine is started only when the result of the verification by the verification module is positive.

The invention furthermore relates to a computer program product, comprising program parts that, when loaded in a computer, are designed to implement the method according to the invention.

First, some terms used in connection with the invention will be explained.

"System start" means the bringing of the wind turbine into a production mode of operation, in which kinetic energy of the wind is converted into electrical energy that is fed into the grid. Before a system start, a wind turbine does not feed any electrical power, generated from the kinetic energy of the wind, into the grid. The wind turbine in this case can be disconnected from the grid. It is not precluded, however, that a wind turbine is connected to the grid before a system start and, for example, is used to regulate the reactive power in the grid. Typical reasons for a wind turbine not feeding-in any electrical power, generated from the kinetic energy of the wind, may be, for example, excessively high or excessively low wind speeds, malfunctions and technical defects of the wind turbine, grid faults, maintenance and repair works on the wind turbine or in the distribution grid, shadows or icing. In such a case, the rotor blades are generally turned to the feathering position, such that the rotor no longer rotates, or rotates only at a low rotational speed (coasting rotational speed). It is also not precluded that the rotor is locked in position by means of a brake.

In the context of the invention, "continuously store" means that the measured values to be stored are stored continuously and independently of the operating state of the wind turbine, i.e. both during the infeeding of electrical power by the wind turbine into the grid and during the periods in which the wind turbine does not feed any electrical power, generated from the kinetic energy of the wind, into the grid.

The "request for a system start" may be a request communicated by the operator of the wind turbine, the operator of the grid into which the wind turbine feeds the electrical energy that it generates, or by an electric power broker, in the case of direct marketing of energy. However, it may also be an automatically generated request that is triggered, for example, after the elimination of a fault in the wind turbine or in the grid, after successful completion of maintenance and repair work or by the presence of suitable wind conditions.

The invention offers the advantage that, in the case of a request to start a wind turbine, the measured values to be observed over a certain monitoring period for the starting of the system are available in retrospect, such that immediately after the request for a system start on the basis of the previously stored measured values, the basic requirements for a system start that were set by means of the defined specifications are fulfilled. It is thus possible to check, immediately after the request for a system start has been received, whether the requested system start can be effected. The wait time of, for example, two minutes, as it is regularly required in the prior art, can be omitted.

In principle, it is possible for the data storage to be realized as a mass storage. However, it is preferred if the data storage is a ring storage. A "ring storage" continuously stores data over a certain period of time and overwrites it after the expiry of a predefined storage period. Storage space occupied by data that are older than the predefined storage period is thereby used for newer, more current, data. The ring storage may be realized as a ring buffer. The use of a ring storage eliminates the need for complex storage logic or large mass storage devices that record historical data over a longer period.

The defined specifications, which must be met by the at least one measured value in the monitoring period, may be, for example, absolute or relative minimum and/or maximum values. However, it is also possible for there to be specifications in respect of the maximum permissible variation of the at least one measured value over the monitoring period. Corresponding specifications may be defined by a maximum permissible spread of the measured values, a maximum permissible gradient and/or a maximum permissible standard deviation.

It is preferred if at least two measured values are stored continuously in the data storage and checked upon a request for a system start. It is possible in this case for the monitoring period and/or the storage period for the at least two measured values to be the same in each case. It is also possible, however, for the monitoring period and/or the storage period for each measured value to be determined individually. If two or more measured values are checked for a system start, the specifications for the measured values may also be combined. Thus, for example, the specifications for a measured value may be dependent on another measured value, this dependence being previously defined. More complex dependencies for specifications and/or measured values are also possible, which may be, for example, in the form of an (in)equality with the number of variables corresponding to the number of measured values, or in the form of characteristic curves.

The at least one measured value may reflect information about the environment of the wind turbine, for example the wind conditions, or the state of the wind turbine itself. In particular, the at least one measured value may comprise at least one measured value from the group of wind direction, wind speed, nacelle azimuth position, tower head acceleration, tower vibration signals, grid parameters (in particular voltage and frequency) and/or temperature of the environment or of individual components of the wind turbine. The measured value may be obtained directly from data from a sensor by which the information in question can be sensed. A possible conversion of the sensor data into measured values is not precluded in this case. It is also possible for the measured value provided according to the invention to be a hybrid measured value, in which various items of information, such as, for example, data from a plurality sensors, are bundled and/or combined.

The monitoring period for at least one measured value may be at least approximately 60 seconds, preferably at least approximately 120 seconds. A corresponding monitoring period may be appropriate, for example for the measurement of wind direction and/or wind speed. For other measurements, however, for example the tower head acceleration and/or tower vibration signals, monitoring periods of approximately 10 seconds, or preferably approximately 20 seconds, may also be sufficient.

It is preferred if reference data are stored continuously in the data storage over a storage period, wherein the reference data are suitable for checking the plausibility of the at least one measured value, and the storage period of the reference data corresponds at least to the monitoring period of the at least one measured value to be checked for plausibility. The reference data may be measured values of the wind turbine or items of information, obtained via sensors, that, although they themselves do not need to be checked for defined specifications in the case of a request for a system start, are nevertheless suitable for checking the plausibility of the measured values, which must be checked accordingly. The reference data may also be externally supplied data, for example from a weather station that is realized separately by the wind turbine. The reference data can be used to check whether the continuously stored measured values are plausible. It is also possible for the reference data and/or the measured values to be used among each other for checking their plausibility. It is also possible to directly check the plausibility of the measured values directly with the aid of maximum or minimum values, maximum permissible gradients, maximum permissible standard deviations or similar, i.e., if necessary, even without recourse to reference data.

The checking of the plausibility of the measured values and/or reference data that are to be stored, or that are stored, in the data storage may already be effected during the continuous storage or, alternatively, during the checking of the at least one measured value upon request for a system start. By checking their plausibility already during the storage of the measured values and/or reference data, there is no longer any need to perform a—possibly time-consuming—plausibility check upon a request for a system start, such that a faster system start becomes possible. If a plausibility check is performed only when a system start request is made, simple patterns in the characteristic of the measured values and/or reference data, such as, for example, reciprocating motions or similar, which can prevent a system start, can be identified.

If a plausibility deficiency is found, it is preferred that the data storage be emptied. At the same time—if possible—the sensors can be reinitialized for those measured values and/or reference data for which a plausibility deficiency has been found. By emptying the data storage, generally the check as to whether the at least one measured value corresponds to the defined specifications will not be able to be positively concluded until the monitoring space for this at least one measured value has been completely filled with measured values. Thus, in particular after a reinitialization of the affected sensors, starting of the system on the basis of erroneous measured values and/or reference data can be prevented in an effective manner.

The plausibility of measured values and/or reference data may be effected by checking on the basis of maximum and/or minimum values, and/or of gradients, mean values and/or standard deviations, wherein corresponding setpoint values may be defined in dependence on other measured values and/or reference data. The corresponding setpoint values are specified.

The reference data may include, for example, the angle of attack of the rotor blades and/or the rotor rotational speed.

The wind turbine according to the invention is designed to implement the method according to the invention. To explain the wind turbine and advantageous developments of the wind turbine, reference is made to the above statements.

Also, to explain the computer program product according to the invention, reference is made to the above statements.

BRIEF DESCRIPTION OF THE DRAWINGS

The invention will now be described by way of example with reference to the accompanying drawings, on the basis of a preferred embodiment. There are shown.

DETAILED DESCRIPTION OF THE INVENTION

Figure 1:
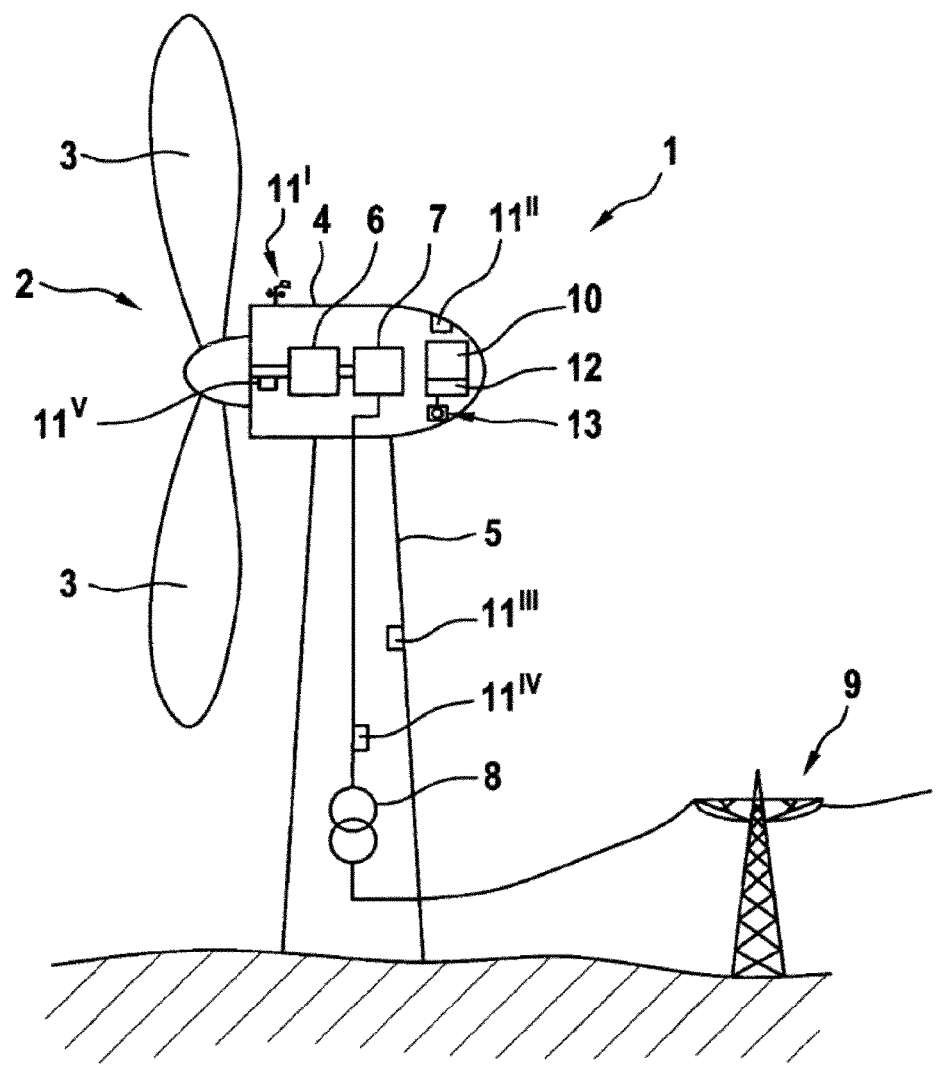
FIG. 1 shows a first exemplary embodiment of a wind turbine according to the invention.

Shown schematically in FIG. 1 is a wind turbine 1 according to the invention. The wind turbine 1 comprises a rotor 2, which has a plurality of rotor blades 3 that can be adjusted in the angle of attack, and which is rotatably arranged on a nacelle 4. The nacelle 4 in turn is rotatably arranged on a tower 5.

Via the rotor shaft, the rotor 2 drives a transmission 6 that, on its output side, is connected to a generator 7. A wind-induced rotational motion of the rotor 2 can thus be converted into electrical energy, which then, possibly via inverters (not represented) and/or transformers 8, can be fed into an electricity grid.

The wind turbine 1 additionally comprises a closed-loop control system 10, which is connected via control lines, not represented, to the various components of the wind turbine 1 for the purpose of controlling them. The closed-loop control system 10 is designed, inter alia, to align the rotor 2 according to the wind, by rotating the nacelle 4 relative to the tower 5. The angle of attack of the rotor blades 3 and the electrical power fed into the grid 9 are also controlled by the closed-loop control system 10. By altering the angle of attack of the rotor blades 3 and the electrical power fed into the grid 9, the closed-loop control system 10 can influence the rotor moment, or generator moment.

The closed-loop control system 10 is connected to various sensors 11, to enable the required control task to be performed. One of these sensors 11 is the wind sensor 11', by means of which the wind direction and the wind speed can be determined. Additionally connected to the closed-loop control system is an acceleration sensor 11", by which the tower head acceleration can be sensed. A further acceleration sensor 11''' is also provided, at approximately half the height of the tower 5, by which vibration modes of the tower 5, that cannot be sensed by the acceleration sensor 11" alone, can be sensed. Information concerning the state of the electricity grid 9 can be sensed by means of the voltage sensor $11^{IV}$. The sensor $11^V$ senses the rotational speed of the rotor 2.

In addition, yet further (not represented) sensors 11 may be provided for the nacelle azimuth position—i.e. the angular position of the nacelle 4 relative to the tower 5—or for the angle of attack of the rotor blades 3. The sensors 11 are usually already provided for the general control of the wind turbine 1 by the closed-loop control system 10.

Provided according to the invention, as part of the closed-loop control system 10, is a verification module 12, which is connected to a data storage 13. The closed-loop control system 10, or the verification module 12, is designed in such a manner that data sensed by at least one of the sensors 11 is stored continuously for a storage period in a data storage 13 realized as a ring buffer 13'.

If the wind turbine 1 is not feeding any electrical power, generated from the kinetic energy of the wind, into the grid, for example because of a fault in the grid 9 or in the wind turbine 1 itself, following elimination of the corresponding fault the closed-loop control system 10 receives a request to restart. For this case, the verification module 12 is designed so as to check, on the basis of the data stored in the ring storage 13', whether a system start is possible.

Figure 2:
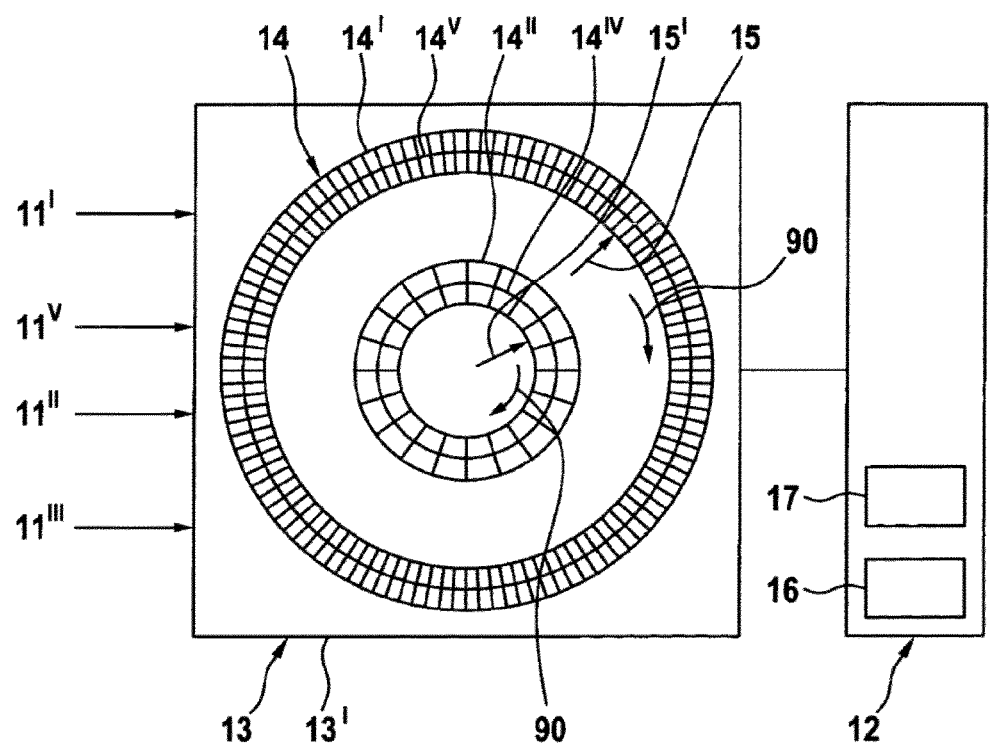
FIG. 2 shows a schematic representation of the verification module and of the data storage of the wind turbine from FIG. 1.

The functioning of the verification module 12 and the ring storage 13' are explained in greater detail on the basis of FIG. 2.

The ring storage 13' is constructed in the form of a plurality of ring buffers and is supplied, for example via the closed-loop control system 10 or via the verification module 12, with the data from the sensors 11 for the wind speed (sensor 11'), the rotor rotational speed (sensor $11^V$), the tower head acceleration (sensor 11"), the acceleration at half-height of the tower 5 (sensor 11''') and the rotor rotational speed (sensor $11^V$).

These sensor data are stored continuously—i.e. irrespective of whether the wind turbine is or is not feeding electrical power, generated from the kinetic energy of the wind, into the grid—in separate ring buffers 14 in the ring storage 13'. The data relating to wind speed and rotor rotational speed are stored in the ring buffers 14' and $14^V$, which each have a storage period of 120 seconds; the tower acceleration data from the sensors 11" and 11''' are stored in the ring buffers 14" and 14''' having a storage period of 20 seconds.

The sectors of the ring buffers 14 represented in FIG. 2 in this case merely illustrate the length of the storage period of the individual ring buffers 14, in seconds, but not the time resolution in which the data from the sensors 11 are present. In particular, the data from the sensors 11" and 11''' relating to the tower acceleration data are present in a high resolution, of several measured values per second. It is also possible for the high-resolution tower acceleration data to be preprocessed in a sensor data processing system (not represented), and for only status signals for the tower acceleration to be stored, in a lower resolution relative to the high-resolution tower acceleration data, in the ring storage 13'.

Received data are in each case written to the location of the pointers 15, 15' revolving in the direction 90, such that, following a complete revolution of a pointer 15, 15', the data stored at a location are overwritten by new data. The revolution speeds of the pointers 15, 15' differ. Thus, for one revolution, the pointer 15 requires 120 seconds, the pointer 15' requiring only 20 seconds.

The data concerning the wind speed and the tower accelerations stored in the ring buffers 14', 14" and 14''' are measured values within the meaning of the present invention, whereas the data stored in the ring buffer 14$^V$ are reference data that—as explained in the following—are used merely to check the plausibility of the other data, but not to check directly whether a system start is allowed.

If the closed-loop control system 10 of the wind turbine 1, which is not feeding any electrical power, generated from the kinetic energy of the wind, into the grid, receives a request to restart, the verification unit first checks the plausibility of the data currently contained in the ring buffers 14' and 14$^V$. For this purpose, it is checked whether the wind speeds (ring buffer 14') basically correlate in respect of time with the rotor rotational speed (ring buffer 14$^V$)—which, in the case of a wind turbine not feeding any electrical energy, generated from the kinetic energy of the wind, into the grid, is the coasting rotational speed—over the entire storage period. If this is not the case, this may be an indication that at least one of the sensors 11' or 11$^V$ is defective. In this case, a system start is prevented by the verification module 12, and a warning—for example via a SCADA system (Supervisory Control and Data Acquisition System), not represented—may be emitted.

If the plausibility check is concluded successfully, the verification module 12 then checks whether the measured values stored in the ring buffers 14', 14" and 14''' fulfill the specifications 16 in the verification module 12.

Additionally or alternatively, the plausibility check may also be effected continuously, i.e. already during storage of the data. Defective sensors 11 can thus be identified more rapidly. Only the case of a corrupt data storage 13 can then not be identified until the data is read out.

For the ring buffer 14', it is checked whether the measured values stored therein are within a range, defined by a minimum and a maximum value, over the entire storage period. Since the measured values are checked over the entire storage period, the monitoring period for the wind speed corresponds to the storage period, i.e. 120 seconds in the exemplary embodiment represented.

The measured values relating to the tower accelerations stored in the ring buffers 14" and 14''' are supplied over the entire storage period, which therefore corresponds to the monitoring period for the tower accelerations, to an analysis module 17 in the verification module 12, where the energy into the individual eigenforms of the tower 5 is determined from the measured values. In this case, there is a specification 16 for the maximum vibration energy for each eigenform.

If all measurement values in the ring buffers 14', 14" and 14''' over the respective monitoring period correspond to the defined specifications 16, the check performed by the verification module 12 produces a positive result, whereupon the closed-loop control system 10 starts the wind turbine 1 in accordance with a predefined process. If the check is negative, the wind turbine 1 is initially not started, and the prescribed checking of the measured values is performed until the check has been concluded successfully. If the result of the test is negative, a corresponding indication—e.g. via a SCADA system, not represented—may be emitted.

If the plausibility check described above is not concluded successfully, all data in the ring buffers 14' and 14$^V$ are erased, or zeroed, by the verification module and, at the same time, the sensors 11' and 11$^V$ are reinitialized. Subsequently, the previously described checking of the measured values from the ring buffer 14' will remain unsuccessful, at least until at least the ring buffer 14' is again completely full with measured values obtained after the reinitialization of the sensors 11' and 11$^V$.

The invention claimed is:

1. A method for operating a wind turbine, the method comprising:
   in response to receiving a request for a system start of the wind turbine, monitoring at least one measured value over a predetermined monitoring period; and
   effecting the system start in response to determining that the at least one measured value in the monitoring period corresponds to defined specifications, wherein:
      the at least one measured value is stored continuously in a data storage and a storage period in the data storage corresponds to at least the predetermined monitoring period, and
      monitoring the at least one measured value in response to receiving the request for the system start comprises checking, on the basis of the data storage, whether the at least one measured value in a storage period corresponding to the monitoring period before the request corresponds to the defined specifications.

2. The method of claim 1, wherein the data storage is a ring buffer.

3. The method of claim 1, wherein at least two measured values are stored continuously in the data storage and checked upon the request for the system start.

4. The method of claim 3, wherein differing monitoring periods or storage periods are specified for the at least two measured values.

5. The method of claim 3, wherein differing monitoring periods and storage periods are specified for the at least two measured values.

6. The method of claim 1, wherein reference data are stored continuously in the data storage over a storage period, the reference data are configured for checking plausibility of the at least one measured value, and the storage period of the reference data corresponds at least to the monitoring period of the at least one measured value to be checked for plausibility.

7. The method of claim 6, comprising in response to finding a plausibility deficiency, emptying the data storage.

8. The method of claim 6, wherein the plausibility checking is based on at least one of maximum values, minimum values, gradients, mean values, and standard deviations.

9. The method of claim 6, wherein the reference data include at least one of an angle of attack of the rotor blades and a rotor rotational speed.

10. The method of claim 1, wherein the at least one measured value or the reference data that are stored in the data storage are checked for plausibility during the continuous storage or during the checking of the at least one measured value upon the request for a system start.

11. The method claim 1, wherein the at least one measured value comprises a measurement of at least one of wind direction, wind speed, nacelle azimuth position, tower head acceleration, tower vibration signals, temperature of the environment, and temperature of individual components of the wind turbine.

12. The method of claim 1, wherein the monitoring period is at least 60 seconds.

13. The method of claim 1, wherein the at least one measured value and the reference data that are stored in the data storage are checked for plausibility during the continuous storage or during the checking of the at least one measured value upon the request for a system start.

14. The method of claim 1, wherein the monitoring period is at least 120 seconds.

15. A wind turbine comprising:
a rotor having a plurality of rotor blades, the rotor being rotatably arranged on a nacelle that is arranged on a tower;
a generator arranged in the nacelle for converting wind energy acting on the rotor into electrical energy;
at least one sensor for sensing at least one measured value;
a data storage for continuously storing the sensed at least one measured value for a storage period; and
a closed-loop control system for controlling the wind turbine, wherein the control system is configured for verifying, in response to a request for a system start, on the basis of the data storage, whether the at least one measured value in the period corresponding to a predetermined monitoring period corresponds to predefined specifications before the request, wherein the storage period corresponds to at least the predetermined monitoring period, and the closed-loop control system is configured to start the wind turbine verifying that the at least one measured value corresponds to the predefined specifications.

16. The wind turbine of claim 15, wherein the data storage is a ring buffer.

17. A non-transitory computer readable medium comprising instructions that, when executed by a computer processor of a wind turbine, cause the wind turbine to:
in response to receiving a request for a system start of the wind turbine, monitor at least one measured value over a predetermined monitoring period; and
effect the system start in response to determining that the at least one measured value in the monitoring period corresponds to defined specifications, wherein:
the at least one measured value is stored continuously in a data storage and a storage period in the data storage corresponds to at least the predetermined monitoring period, and
monitoring the at least one measured value in response to receiving the request for the system start comprises checking, on the basis of the data storage, whether the at least one measured value in a storage period corresponding to the monitoring period before the request corresponds to the defined specifications.

* * * * *